G. A. H. KELLNER.
HOLDER FOR TRIAL LENS SETS.
APPLICATION FILED NOV. 3, 1915.
1,258,417.
Patented Mar. 5, 1918.
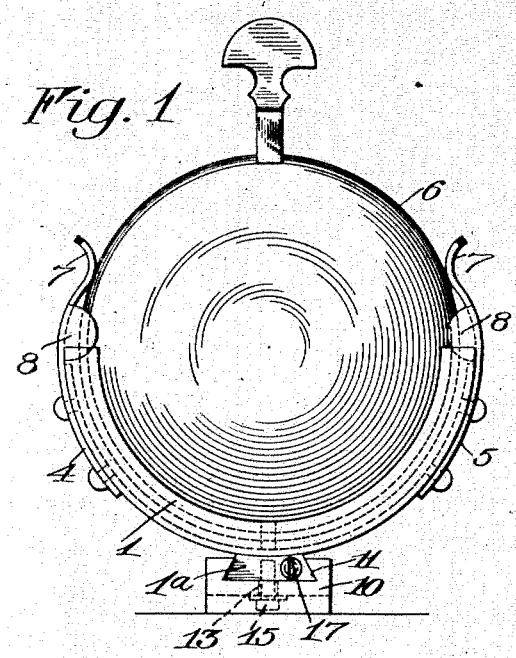
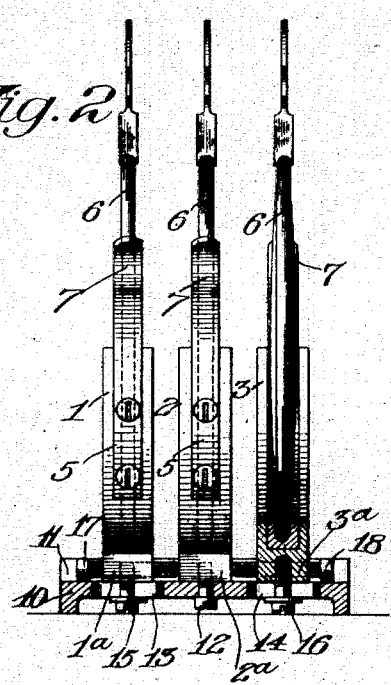
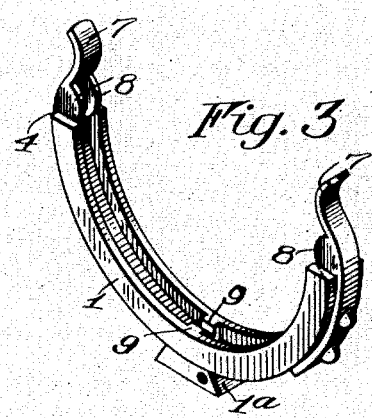
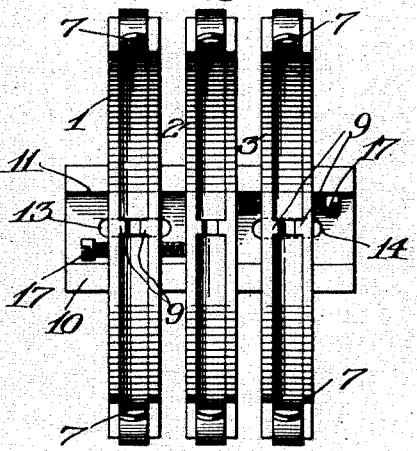
Witnesses
Walter D. Payne
Nelan H. Opp
INVENTOR
Gustav A. H. Kellner
BY
Church & Rich
his ATTORNEYS

UNITED STATES PATENT OFFICE.

GUSTAV A. H. KELLNER, OF ROCHESTER, NEW YORK, ASSIGNOR TO BAUSCH & LOMB OPTICAL COMPANY, OF ROCHESTER, NEW YORK, A CORPORATION OF NEW YORK.

HOLDER FOR TRIAL-LENS SETS.

1,258,417.  Specification of Letters Patent.  Patented Mar. 5, 1918.

Application filed November 3, 1916. Serial No. 129,297.

*To all whom it may concern:*

Be it known that I, GUSTAV A. H. KELLNER, of Rochester, in the county of Monroe and State of New York, have invented certain new and useful Improvements in Holders for Trial-Lens Sets; and I hereby declare the following to be a full, clear, and exact description of the same, reference being had to the accompanying drawings, forming a part of this specification, and to the reference-numerals marked thereon.

My present invention has for its object to provide a lens holder adapted particularly for use in conjunction with lens testing, or lens measuring instruments whereby the focalizing power of the test lenses used by opticians in correcting errors in vision, when removed from the holder worn by a patient, may be accurately determined, especially when two or more of such lenses are used in combination, in order that the true value of the single lens to be given the patient may equal that produced by the combination of test lenses. To these and other ends the invention consists in certain improvements and combinations of parts all as will be hereinafter more fully described, the novel features being pointed out in the claims at the end of the specification.

In the drawings:

Figure 1 is an enlarged elevation of a holder showing one embodiment of my present invention;

Fig. 2 is a side elevation thereof partly in section;

Fig. 3 is a perspective view of one of the lens holding arms, and

Fig. 4 is a top plan view thereof.

Similar reference numerals throughout the figures indicate similar parts.

In fitting persons to spectacles, or eye glasses, in order to correct errors in vision the optician, or optometrist, employs what is known as a trial frame which is provided with various adjustments, the essential features to which I wish to refer being the means employed for removably supporting the test lenses. This part of the apparatus comprises a ring having at its forward and rear sides pockets, or spring clips, in which one, two, or possibly, three different trial lenses may be inserted. These lenses are interchangeable and revolubly adjustable so that many different combinations may be made until the proper combination is accurately determined to supply the deficiency in the sight of a particular eye. From the combined values of these test lenses the optometrist may compute the true value of the single lens which is to be mounted in the spectacles, or eye glasses, to be delivered to the patient and have such lens ground to produce the necessary curves, or surfaces, according to such computations.

It is possible by the use of special optical instruments designed for the purpose to reproduce conditions of refraction in a lens similar to those obtained in conjunction with the human eye and thus determine absolutely the focalizing power of the test lenses in the position which they occupy in front of the wearer's eye, but in such instruments it is quite essential that the lens, or combination of lenses which are to be measured shall be held perfectly rigid and also occupy the same position, that is be separated the same distance as in the trial frame when the test was made. It is impracticable to attempt to obtain an accurate measurement by the use of such an instrument while the test lenses are in the trial frame, both because of the clumsiness of the latter contributing to the difficulty with which the operator can handle it, and to the fact that the lenses therein are not secured with sufficient rigidity, either against lateral displacement, or movement axially relatively to each other to permit their being handled. I have obviated these difficulties by providing the separate holding instrument comprising generally a plurality of lens holders which are supported for relative adjustment.

In illustrating my invention I have shown an instrument comprising three lens holders indicated by 1, 2 and 3, each comprising a semi-circular curved arm having a channel, or recess upon its inner periphery provided at its extremities with spring clips 4 and 5. The curved arms are preferably semi-circular to embrace the lower half of the periphery of a trial lens indicated by 6, leaving the central portion thereof unobstructed, and the springs have curved tips 7 which grip the rim of a lens at points somewhat above its horizontal diameter. Each of the springs is also provided with a pair of inwardly extending lugs 8, which are spaced apart sufficiently to allow them to firmly grip opposite sides of a lens. Also located at the bottom point of the arms and in the recess therein, are opposing lugs 9—9 which perform the same function attributed to the ears 8 so that the trial lens is held vertically by engagement with fingers bearing at a plurality of points located about its periphery while it is held in engagement with said holding means by the ends 7 of the springs.

The lens holders are mounted upon a suitable support, or base, 10, provided on its upper surface with a longitudinally extending dove tail curve 11, which receives the correspondingly shaped lugs 1ª, 2ª and 3ª on the lower side of each of the curved arms 1, 2 and 3. One of the latter, preferably the intermediate holder 2, is secured rigidly to the base by a set screw 12 while the others are capable of being moved relatively thereto, this adjustment being permitted by providing the base with longitudinally extending slots 13 and 14 through which the attaching screws 15 and 16 are passed. The accurate adjustment of the lens holders 1 and 3 with reference to each other and to the intermediate lens holder 2 is accomplished by set screws 17 and 18, which pass through the lugs 1ª and 3ª and bear against the proximate faces of the lug 2ª.

The arrangement of the parts described permits the adjustment of the lens holders relatively to each other, in the direction of the axis of the lenses supported thereon, which permits the optometrist to bring the lens holders into exact coincidence with the positions occupied by the test lenses when applied to the trial frame which he is in the habit of using.

An instrument embodying my present invention is especially adapted for use with opthalmic lenses and when the holders are properly adjusted to correspond to a particular trial frame, the user thereof knows that the lenses are firmly supported and may proceed with certainty in applying them to his measuring instrument, even if the latter comprises an element, or member, which is to be adjusted into contact with the surface of one of the lenses which would cause said lens to be displaced out of its true position were it not held rigid.

I claim as my invention:

1. The combination with a base, lens holding frames mounted thereon comprising curved channel arms for embracing the periphery of a lens and means for adjusting said frames on the base relatively to each other and rigidly locking them in adjusted position.

2. The combination with a base, lens holding frames mounted thereon comprising upwardly curved sides provided with a channel adapted to support the edges of trial lenses, of clips engaging the latter and detachably holding them seated in the channels, and means for effecting the relative adjustment of the holding frames on the base.

3. The combination with a base, of three lens holding frames each adapted to support a trial lens, said frames being disposed to support their respective lenses in axial alinement, the intermediate frame being fixed to the base and the other two being adjustable thereon.

4. The combination with a base, a plurality of trial lens holders mounted thereon, each comprising a semi-circular arm provided with an interior channel, and centering lugs at the bottom of the channel, of spring clips secured to the arms having spaced ears projecting into the ends of the channel and adapted to embrace the sides of a lens and coöperate with said centering lugs to rigidly support a lens by engagement with the periphery thereof at separated points.

5. The combination with a base having a groove in its upper edge and provided with longitudinal slots in the bottom of the groove, and a curved arm adapted to support a trial lens having a lug on its lower side fitting the groove and rigidly secured thereon intermediate the slots, of other curved arms located at each side of the first mentioned arms also having lugs, set screws passing through the slots and entering said lugs and adjusting screws in the latter engaging the intermediate lens holder for the purpose of positioning the others relatively thereto.

GUSTAV A. H. KELLNER.